Patented May 12, 1931

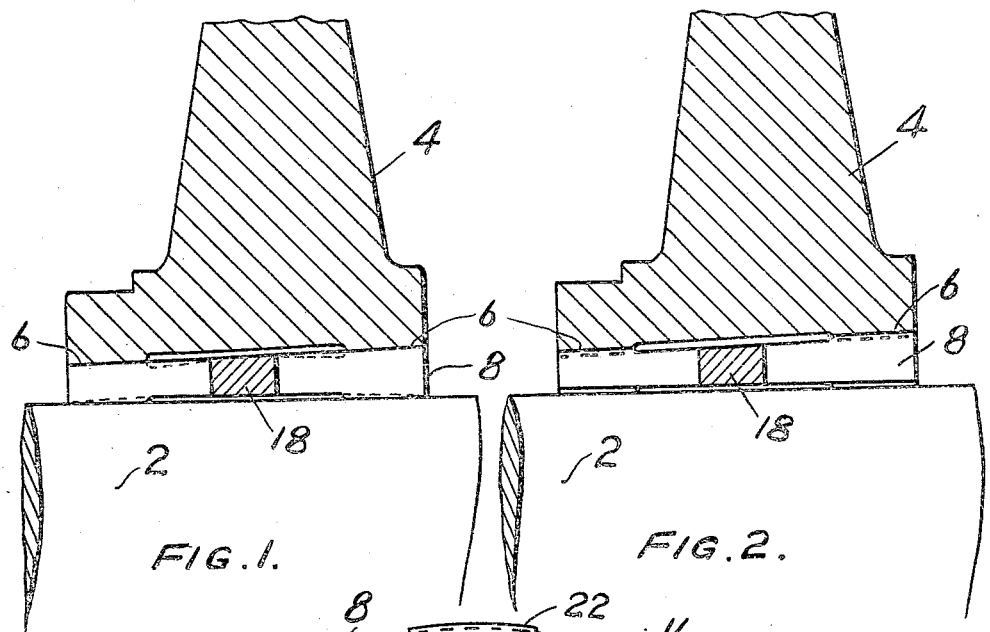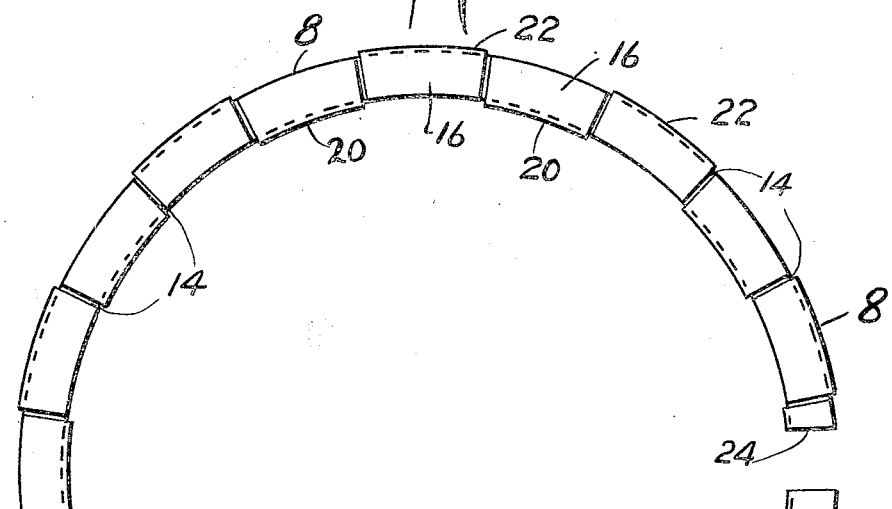

1,805,201

UNITED STATES PATENT OFFICE

RUDOLPH BIRMANN, OF TRENTON, NEW JERSEY, ASSIGNOR TO DE LAVAL STEAM TURBINE COMPANY, OF TRENTON, NEW JERSEY, A CORPORATION OF NEW JERSEY

SLEEVE FOR HIGH SPEED WHEELS

Application filed May 3, 1929. Serial No. 360,283.

This invention relates to means for mounting a rotor operating at high speed upon a shaft and relates more specifically to a sleeve adapted to maintain a rotor in proper position upon its supporting shaft.

The rotating elements of high speed rotary mechanisms such as the rotors of turbines, or the like, are subjected to enormous centrifugal stresses tending to cause them to expand outwardly. This expansion is increased in mechanisms such as turbines by reason of the high operating temperatures. Accordingly, in the absence of special precautions, the rotating elements become loose on the shaft at high speeds and assume excentric positions relative thereto with consequent severe vibration and irregular running.

Heretofore two methods have been quite generally used to avoid the difficulties above mentioned. The first method involves shrinking of the rotor upon the shaft so that the initial strain of the shaft and bore will allow sufficient expansion of the parts at high speed to insure a tight fit; while the second method involves forcing the rotor upon a split tapered sleeve surrounding the shaft for the same purpose. In both cases it is necessary to heat the rotor or wheel during assembly so that distortion frequently results, producing unbalancing and vibration and causing the wheel to run out of true. Frequently it is found quite impossible to achieve, while properly designing the parts, the imposition of an initial stress in the shaft and hub sufficient to produce the desired results. And it is generally practically impossible to remove the rotor from the shaft without damage to either or both.

The broad object of the present invention is the provision of a device for maintaining the rotor and shaft in concentric relationship at all operating speeds. More specifically it is the object of the invention to provide an expanding sleeve between the rotor and shaft to achieve this result.

In the accompanying drawings:

Fig. 1 is a sectional view of the assembled rotor, sleeve and shaft at rest;

Fig. 2 is a similar view showing the assembly at high speed;

Fig. 3 is an end elevation of the improved sleeve;

A supporting shaft is indicated at 2 in Figures 1 and 2, this shaft being adapted to carry a wheel, such as a turbine rotor, designated 4. The shaft is cylindrical whereas the bore through the hub of the wheel is tapered as indicated at 6, this bore being either smooth from one face of the hub to the other or grooved, as shown, to provide two bearing surfaces at its outer ends. Interposed between the shaft and the bearing surfaces of the bore is a sleeve 8 forming the subject matter of the present invention and which may, if convenient, be made to replace the tapered sleeves ordinarily used in this location. The construction of this sleeve will be made clear from the following description of its manufacture.

Figure 4:
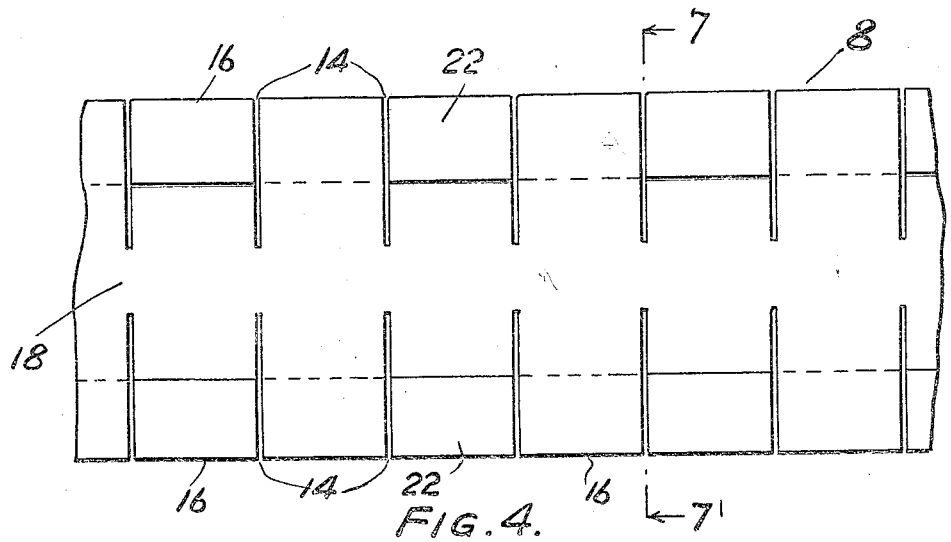
Fig. 4 is a development of the sleeve into a plane to show its construction.
Figure 5:
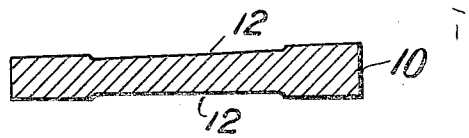
Fig. 5 is a section of a blank from which the sleeve is formed.
Figure 6:
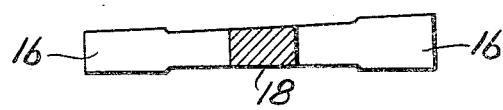
Fig. 6 is a section of the blank after an initial step in the formation of the sleeve.
Figure 7:
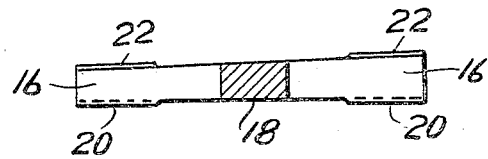
Fig. 7 is a section of the sleeve taken as indicated by line 7—7 of Fig. 4.

A blank 10 of the form of an annulus of suitable metal having high resilience, such as spring steel, or of a flat form adapted to be later formed into annular shape has a cross section such as shown in Fig. 5, grooves 12 being provided in the inner and outer surfaces as shown, leaving bearing surfaces along the edges, the inner ones of which are cylindrical (or adapted to be made cylindrical), while the outer ones are tapered so as to correspond with (or be made to correspond with), the tapered bore of the wheel. Saw cuts 14 are made inwardly from the opposite edges as shown in Fig. 4, producing distortable teeth 16 carried by the continuous annular supporting portion 18. The outer radially projecting portions of alternate pairs of opposite teeth are now removed to the level of outer grooves 12 and the inner radially projecting portions of the other pairs of opposite teeth are similarly removed to the level of inner groove 12 with the production of a finished sleeve of the form shown in Figs. 3, 4 and 7, having inwardly extending bearing pads 20 carried by alternate pairs of opposite teeth and outwardly extending bearing pads 22 carried by the intermediate pairs of opposite teeth, the bearing surfaces of pads 20 in the finished ring being cylindrical and the bearing surfaces of pads 22 being conically tapering.

The finished ring is split as indicated at 24 for the passage of the key securing the rotor against rotation relative to the shaft in the usual manner.

The operation of the sleeve in use will be apparent from Figs. 1 and 2. The resilience of the metal composing the sleeve is sufficient, under the assembling pressure incident to forcing the tapered bore of wheel 4 over the sleeve, to permit distortion of the teeth 16 as indicated, the thicknesses of the teeth including the bearing pads being approximately equal to the respective annular spaces between the ends of the bore and the shaft, so that the ends of the teeth will be brought into substantially annular alignment. During high speed operation and increase of temperature, as the bore through the wheel expands, the teeth will spring outwardly, always maintaining the pads 20 and 22 in tight engagement with the bearing surfaces of the shaft and wheel, respectively, and thus maintaining the shaft and wheel concentric, with consequent prevention of vibration. The sleeve is designed, of course, so that the movement of the teeth is sufficient to compensate for the maximum expansion of the wheel.

While the teeth, which in effect form leaf springs carried by the supporting portion 18, are not easily distorted, and therefore provide a firm mounting for the wheel, nevertheless the force required to deflect them is only a fraction of that required to expand the wheel hub so that strains are minimized and assembly and disassembly made very much easier.

Having now fully described my invention, what I claim and desire to protect by Letters Patent is:

1. Means for mounting a rotor upon a shaft including an annular supporting portion carrying two series of resilient axially extending members, the members of one series having outer bearing surfaces and the members of the other series having inner bearing surfaces, the normal difference of radii of the outer and inner surfaces being greater than the normal difference of radii of the portions of the rotor and shaft with which the respective surfaces are to contact, whereby, in the assembly of said means between the rotor and shaft the members are displaced so that they resiliently press in opposite directions to maintain engagement with the rotor and shaft respectively.

2. Means for mounting a rotor upon a shaft including an annular supporting portion carrying two series of resilient axially extending members, the members of one series alternating with the members of the other series, the members of one series having outer bearing surfaces and the members of the other series having inner bearing surfaces, the normal difference of radii of the outer and inner surfaces being greater than the normal difference of radii of the portions of the rotor and shaft with which the respective surfaces are to contact, whereby, in the assembly of said means between the rotor and shaft the members are displaced so that they resiliently press in opposite directions to maintain engagement with the rotor and shaft respectively.

3. Means for mounting a rotor upon a shaft including an annular supporting portion carrying on each side thereof two series of resilient axially extending members, the members of one series having outer bearing surfaces and the members of the other series having inner bearing surfaces, the normal difference of radii of the outer and inner surfaces being greater than the normal difference of radii of the portions of the rotor and shaft with which the respective surfaces are to contact, whereby, in the assembly of said means between the rotor and shaft the members are displaced so that they resiliently press in opposite directions to maintain engagement with the rotor and shaft respectively.

4. Means for mounting a rotor upon a shaft including an annular supporting portion carrying on each side thereof two series of resilient axially extending members, the members of one series alternating with the members of the other series, the members of one series having outer bearing surfaces and the members of the other series having inner bearings surfaces, the normal difference of radii of the outer and inner surfaces being greater than the normal difference of radii of the portions of the rotor and shaft with which the respective surfaces are to contact, whereby, in the assembly of said means between the rotor and shaft the members are displaced so that they resiliently press in opposite directions to maintain engagement with the rotor and shaft respectively.

5. Means for mounting a rotor upon a shaft including an annular supporting portion carrying integrally therewith two series of resilient axially extending members, the members of one series having outer bearing surfaces and the members of the other series having inner bearing surfaces, the normal difference of radii of the outer and inner surfaces being greater than the normal difference of radii of the portions of the rotor and shaft with which the respective surfaces are to contact, whereby in the assembly of said means between the rotor and shaft the members are displaced so that they resiliently press in opposite directions to maintain engagement with the rotor and shaft respectively.

6. Means for mounting a rotor upon a shaft including an annular supporting portion carrying on each side thereof and integrally therewith two series of resilient axially extending members, the members of one series having outer bearing surfaces and the members of the other series having inner bearing surfaces, the normal difference of radii of the outer and inner surfaces being greater than the normal difference of radii of the portions of the rotor and shaft with which the respective surfaces are to contact, whereby, in the assembly of said means between the rotor and shaft the members are displaced so that they resiliently press in opposite directions to maintain engagement with the rotor and shaft respectively.

7. Means for mounting a rotor upon a shaft, which rotor is provided with a tapered bore surrounding the shaft, including an annular supporting portion carrying two series of resilient axially extending members, the members of one series having outer bearing surfaces and the members of the other series having inner bearing surfaces, the normal difference of radii of the outer and inner surfaces being greater than the normal difference of radii of the portions of the surface of the bore and shaft with which the respective surfaces are to contact, whereby, in the assembly of said means between the rotor and shaft the members are displaced so that they resiliently press in opposite directions to maintain engagement with the tapered surface of the bore and the shaft respectively.

8. Means for mounting a rotor upon a shaft, which rotor is provided with a tapered bore surrounding the shaft, including an annular supporting portion carrying on each side thereof two series of resilient axially extending members, the members of one series having outer bearing surfaces and the members of the other series having inner bearing surfaces, the normal difference of radii of the outer and inner surfaces being greater than the normal difference of radii of the portions of the surface of the bore and shaft with which the respective surfaces are to contact, whereby, in the assembly of said means between the rotor and shaft the members are displaced so that they resiliently press in opposite directions to maintain engagement with the tapered surface of the bore and the shaft respectively.

9. Means for mounting a rotor upon a shaft, which rotor is provided with a tapered bore surrounding the shaft, including an annular supporting portion carrying on each side thereof and integrally therewith two series of resilient axially extending members, the members of one series having outer bearing surfaces and the members of the other series having inner bearing surfaces, the normal difference of radii of the outer and inner surfaces being greater than the normal difference of radii of the portions of the surface of the bore and shaft with which the respective surfaces are to contact, whereby, in the assembly of said means between the rotor and shaft the members are displaced so that they resiliently press in opposite directions to maintain engagement with the tapered surface of the bore and the shaft respectively.

In testimony of which invention, I have hereunto set my hand, at Trenton, N. J., on this 30th day of April, 1929.

RUDOLPH BIRMANN.